United States Patent [19]

Halpaap et al.

[11] Patent Number: 4,900,800

[45] Date of Patent: Feb. 13, 1990

[54] POWDER LACQUER AND ITS USE FOR COATING HEAT-RESISTANT SUBSTRATES

[75] Inventors: Reinhard Halpaap; Josef Pedain, both of Koeln; Hans-Joachim Kreuder, Krefeld; Gerhard Klein, Monheim; Walter Schäfer, Leichlingen; Dieter Arlt, Koeln, all of Fed. Rep. of Germany

[73] Assignee: Bayer Aktiengesellschaft, Bayerwerk, Fed. Rep. of Germany

[21] Appl. No.: 73,927

[22] Filed: Jul. 15, 1987

[30] Foreign Application Priority Data

Jul. 22, 1986 [DE] Fed. Rep. of Germany ....... 3624775

[51] Int. Cl.$^4$ ..................... C08G 18/10; C08G 18/32; C08F 8/00
[52] U.S. Cl. ......................... 528/66; 528/60; 528/65; 525/440; 525/118
[58] Field of Search ............. 528/60, 65, 66; 525/118, 440

[56] References Cited

U.S. PATENT DOCUMENTS

| | | | |
|---|---|---|---|
| 3,819,586 | 6/1974 | Rudolph et al. | 260/77.5 |
| 3,849,160 | 11/1974 | Dhein et al. | 117/17 |
| 3,849,168 | 11/1974 | Hoffman, Jr. | 117/106 |
| 3,954,719 | 5/1976 | Pirck et al. | 260/77.5 |
| 3,992,316 | 11/1976 | Pedain et al. | 528/67 |
| 4,212,962 | 7/1980 | Schmitt et al. | 528/45 |
| 4,246,380 | 1/1981 | Gras et al. | 525/440 |
| 4,252,923 | 2/1981 | Konig et al. | 525/452 |
| 4,313,876 | 2/1982 | Gras et al. | 260/239 |
| 4,369,301 | 1/1983 | Konig et al. | 528/45 |
| 4,413,079 | 11/1983 | Disteldorf et al. | 524/169 |
| 4,463,154 | 7/1984 | Disteldorf et al. | 528/45 |
| 4,482,721 | 11/1984 | Wegner et al. | 548/262 |
| 4,483,798 | 11/1984 | Disteldorf et al. | 260/239 |
| 4,613,685 | 9/1986 | Klein et al. | 560/330 |

FOREIGN PATENT DOCUMENTS

| | | |
|---|---|---|
| 71812 | 2/1983 | European Pat. Off. |
| 3434881 | 4/1986 | European Pat. Off. |
| 182996 | 6/1986 | European Pat. Off. |
| 2246620 | 3/1974 | Fed. Rep. of Germany |
| 2542195 | 3/1977 | Fed. Rep. of Germany |
| 2946085 | 5/1981 | Fed. Rep. of Germany |
| 3004876 | 8/1981 | Fed. Rep. of Germany |
| 3507719 | 9/1986 | Fed. Rep. of Germany |
| 1450414 | 9/1976 | United Kingdom |

OTHER PUBLICATIONS

Polyurethane Handbook, Hanser Publishers, 1985, pp. 527–529.

*Primary Examiner*—Harold D. Anderson
*Assistant Examiner*—Dennis R. Daley
*Attorney, Agent, or Firm*—Joseph C. Gil; Thomas W. Roy

[57] ABSTRACT

The present invention relates to a powder lacquer containing a mixture of (A) a polyisocyanate component in power form which is solid below about 40° C. and liquid above about 150° C. and (B) a organic polyhydroxyl component in powder form which is solid below about 40° C. and liquid above about 150° C., components (A) and (B) being present in quantities corresponding to an equivalent ratio of isocyanate groups to hydroxyl groups of about 0.6:1 to 1.2:1, characterized in that component (A) is based on a polyisocyanate or polyisocyanate mixture which (a) does not contain any blocking agents for isocyanate groups, (b) has a content of free isocyanate groups (expressed as NCO) attached to tertiary, aliphatic or cycloaliphatic carbon atoms of about 8 to 24% by weight and an average NCO functionality of at least 2.1, (c) has a urethane group content (expressed as —NH—CO—O—) of about 3 to 30% by weight and (d) has an isocyanurate group content (expressed as $C_3N_3O_3$) of 0 to about 30% by weight.

The present invention also relates to the use of this powder lacquer for the production of coatings on heat-resistant substrates by methods known in powder lacquer technology.

3 Claims, No Drawings

POWDER LACQUER AND ITS USE FOR COATING HEAT-RESISTANT SUBSTRATES

BACKGROUND OF INVENTION

1. Field of the Invention

This invention relates to a new powder lacquer based on combinations of organic polyhydroxyl compounds with organic polyisocyanates as crosslinking agent and to the use of this powder lacquer in the production of coatings on heat-resistant substrates.

2. Description of the Prior Art

Polyurethane-based powder lacquers are known (for example DE-AS 1,957,483, DE-OS 2,047,718, DE-OS 2,064,098, DE-PS 2,127,839, DE-OS 2,246,620, DE-AS 2,351,477, DE-OS 2,429,517). The hardener components used are blocked polyisocyanates. Hardeners prepared from isophorone diisocyanate (IPDI) and generally blocked with ε-caprolactam have often been described for light-stable lacquer systems (for example DE-OS No. 2,105,777, 2,542,191, 2,735,497, 2,842,641, 2,929,224, 3,004,876, 3,039,824).

Lacquers combining easy handling with good flow, high hardness and elasticity and good resistance to chemicals are obtained from these ε-caprolactam-blocked IPDI derivatives after baking with suitable polyhydroxyl compounds. Unfortunately, one disadvantage of these polyurethane-based powder lacquers is the high baking temperature of approximately 200° C. Another disadvantage lies in the elimination of the blocking agent which means that special measures have to be taken during the processing of the powder lacquers to clean the exhaust air and to recover the blocking agent. The elimination of the blocking agent is also a barrier to the introduction of new techniques, including for example the use of direct, gas-heated baking ovens and the use of infrared hardening.

There has been no shortage of attempts to lower the high baking temperatures by using other blocking agents. For example, triazoles (DE-OS 2,812,252), cyclic amidines (DE-OS 2,946,085) and secondary amines (DE-OS 3,434,881) have been proposed as blocking agents with relatively low elimination temperatures for polyurethane powder lacquer hardeners.

However, this does not eliminate the fundamental disadvantage of the presence of blocking agents in the powder lacquer. The above-described difficulties which can arise through the eliminated blocking agent remain and preclude having a resin which completely reacts to a lacquer film, despite the absence of solvents.

An attempt to overcome this fundamental disadvantage was made by using unblocked, linear uretdione- and urethane-group-containing IPDI derivatives which contain terminal urethane, urea or free NCO groups (EP-A-0,045,994, EP-A-0,045,996 or EP-A-0,045,998). When crosslinking agents such as these are used, the polyhydroxyl compounds are crosslinked through the splitting up of the uretdione rings. The disadvantage here is the strict linearity of the crosslinking agent which is necessary for the synthesis process and which precludes branching of the lacquer to impart high solvent resistance, scratch resistance and extreme hardness by variation of the hardener.

Accordingly, an object of the present invention is to provide a new powder lacquer which is not attended by any of the above-mentioned disadvantages of the prior art, i.e. which in particular may be baked at low temperatures to form highly crosslinked lacquers without the elimination of blocking agents.

According to the invention, this object may be achieved with the powder lacquers described in detail hereinafter.

The hardener component of the powder lacquer according to the invention is based on a specific unblocked polyisocyanate or polyisocyanate mixture. The concept of using unblocked polyisocyanates having a high concentration of free isocyanate groups as hardeners was by no means obvious because a powder lacquer of the type in question containing free hydroxyl groups and free isocyanate groups would normally be expected to undergo premature crosslinking, thus leaving the ready-to-use lacquer with an inadequate shelf life.

Although the use of unblocked polyisocyanates as crosslinking agents for powder lacquers is proposed in EP-A-0,071,812, crosslinking takes place through an NCO/epoxide reaction according to the teaching of this publication. This reaction has to be carried out in the strict absence of free hydroxyl groups because otherwise crosslinking and gelation would occur during the mixing and extrusion of the components.

Although isocyanates containing urethane groups, of the type which may be used as component (A) in accordance with the present invention, are already known (EP-A-0,182,996), it is emphasized in this publication that combinations of these urethane-modified polyisocyanates with polyhydroxyl compounds represent two-component systems, i.e. systems which only have a limited pot life.

Although the polyisocyanates containing isocyanurate groups according to Applicants' earlier German Patent Application P 35 07 719.0 may also be used inter alia as unblocked crosslinking agents for powder lacquers, the teaching of this patent application does not belong to the published prior art.

SUMMARY OF THE INVENTION

The present invention relates to a powder lacquer containing a mixture of (A) a polyisocyanate component in powder form which is solid below about 40° C. and liquid above about 150° C. and (B) an organic polyhydroxyl component in powder form which is solid below about 40° C. and liquid above about 150° C., components (A) and (B) being present in quantities corresponding to an equivalent ratio of isocyanate groups to hydroxyl groups of about 0.6:1 to 1.2:1, characterized in that component (A) is based on a polyisocyanate or polyisocyanate mixture which (a) does not contain any blocking agents for isocyanate groups, (b) has a content of free isocyanate groups (expressed as NCO) attached to tertiary, aliphatic or cycloaliphatic carbon atoms of about 8 to 24% by weight and an average NCO functionality of at least 2.1, (c) has a urethane group content (expressed as —NH—CO—O—) of about 3 to 30% by weight and (d) has an isocyanurate group content (expressed as $C_3N_3O_3$) of 0 to about 30% by weight.

The present invention also relates to the use of this powder lacquer for the production of coatings on heat-resistant substrates by methods known in powder lacquer technology.

DETAILED DESCRIPTION OF THE INVENTION

To prepare the crosslinking agent (A) essential to the invention, certain starting diisocyanates (Aa) are reacted with certain polyhydroxyl compounds (Ab) in an NCO:OH equivalent ratio of about 1.6:1 to 40:1, preferably about 1.8:1 to 20:1, the reaction products optionally being further modified on completion of the reaction.

Component (Aa) is either (i) an aliphatic-cycloaliphatic diisocyanate having an NCO content of about 20 to 50% by weight, preferably about 30 to 48% by weight, which contains a sterically hindered, cycloaliphatically bound isocyanate group in addition to a sterically unhindered, aliphatically bound isocyanate group and/or (ii) an aromatic or cycloaliphatic compound containing two isocyanatoalkyl substituents and having an NCO content of about 20 to 35% by weight, preferably about 25 to 35% by weight, wherein both isocyanate groups are attached to tertiary aliphatic carbon atoms.

Suitable starting diisocyanates (i) are those corresponding to the following formula

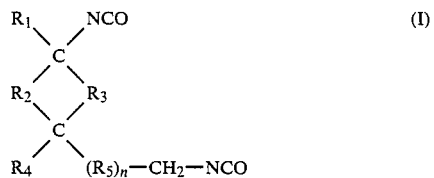

wherein $R_1$ represents a $C_1$-$C_4$ alkyl radical, preferably a methyl radical, $R_2$ and $R_3$ may be the same or different and represent a difunctional linear or branched, saturated hydrocarbon radical containing 1 to 4, preferably 1 to 3 carbon atoms, the sum of the carbon atoms of these radical preferably being from 3 to 6, most preferably 4 or 5, $R_4$ represents hydrogen or a $C_1$-$C_4$ alkyl radical, preferably hydrogen or a methyl radical, $R_5$ represents a difunctional, linear or branched, saturated aliphatic hydrocarbon radical containing 1 to 4, preferably 1 to 3 carbon atoms and n=0 or 1.

Particularly preferred diisocyanates (i) include 1-isocyanato-1-methyl-4(3)-isocyanatomethylcyclohexane (which is generally present as a mixture of the 4- and 3-isocyanatomethyl isomers), 1-isocyanato-1-methyl-4(4-isocyanatobut-2-yl)-cyclohexane, 1-isocyanato-1,2,2-trimethyl-3-(2-isocyanatoethyl)-cyclopentane or 1-isocyanato-1,4(3)-dimethyl-4(3)-isocyanatomethyl cyclohexane (which is generally present as a mixture of the 4-methyl-4-isocyanatomethyl and 3-methyl-3-isocyanatomethyl isomers). Other suitable diisocyanates (i) include 1-isocyanato-1-n-butyl-3-(4-isocyanatobut-1-yl)cyclopentane, 1-isocyanato-1-ethyl-4-n-butyl-4-(4-isocyanatobut-1-yl)-cyclohexane and 1-isocyanato-1,2-dimethyl-3-ethyl-3-isocyanatomethyl-cyclopentane.

These isocyanates (i) are known and their production is described in DE-OS 3,402,623 (EP-A-0,153,561 and U.S. Pat. No. 4,613,685).

Suitable starting diisocyanates (ii) include those corresponding to the following formula

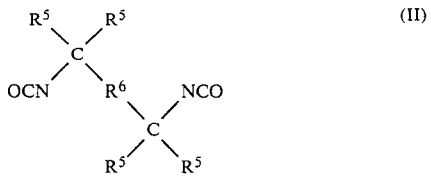

wherein $R^5$ represents a $C_1$-$C_4$ alkyl radical, preferably a methyl radical and $R^6$ represents a difunctional aromatic hydrocarbon radical selected from phenylene, biphenylene or naphthylene radicals which may optionally be substituted by halogen, methyl or methoxy.

Particularly preferred diisocyanates (ii) are 1,3- and 1,4-bis-(2-isocyanatoprop-2-yl)-benzene. The diisocyanates corresponding to formula (II) are also known and their production is described, for example, in EP-A-0,101,832.

The polyhydroxyl compounds (Ab) are 2- to 4-functional hydroxyl compounds containing aliphatically bound hydroxyl groups and having a molecular weight of 62 to less than 400, such as ethylene glycol, diethylene glycol, triethylene glycol, propylene glycol, dipropylene glycol, tripropylene glycol, tetrapropylene glycol, 1,4-butanediol, 1,6-hexanediol, 4,4'-dihydroxydicyclohexyl methane, 2,2-bis-(4-hydroxycyclohexyl)propane, 1,4-bis-(2-hydroxyethoxy)-benzene, bis-hydroxymethylcyclohexane, 2,2-dimethyl-1,3-propanediol, trimethylol propane, tris-hydroxyethyl isocyanurate, pentaerythritol or mixtures of these polyhydroxyl compounds.

In the process for preparing the polyisocyanates essential to the invention, the starting diisocyanates (Aa) are reacted with the polyols (Ab) in the above-mentioned NCO:OH equivalent ratio of about 1.6:1 to 40:1, preferably of about 1.8:1 to 20:1 to the theoretically calculated NCO-content. The choice of the polyhydroxyl component (Ab) is made to ensure that the resulting polyisocyanates containing urethane groups have an average NCO functionality of at least 2.1, preferably 2.1 to about 3.5 and most preferably about 2.2 to 2.6, unless—as described hereinafter—the reaction is followed by a trimerization reaction which leads to an increase in the NCO functionality. In such a case, dihydric alcohols may even be exclusively used as the polyhydroxyl compounds (Ab); whereas, in the first case mixtures of dihydric alcohols and higher alcohols or exclusively higher than dihydric alcohols are used.

In the described process, the reaction temperature required for urethane formation is about 20° to 200° C., preferably about 40° to 160° C. and most preferably about 40° to 120° C. The reaction is preferably carried out in the absence of solvents.

When diisocyanates (ii) containing two sterically hindered isocyanate groups are used, the reaction is generally followed by thin-layer distillation to distill off the excess monomeric diisocyanate and obtain low-monomer polyisocyanates (monomer content less than 1.0% by weight) suitable for the purposes of the invention.

When diisocyanates (i) containing a sterically hindered and a sterically unhindered isocyanate group are used as starting diisocyanates for the polyisocyanates usable in accordance with the invention, there is no need for thin-layer distillation. Providing the reaction is carried out at an NCO:OH equivalent ratio of about 1.6:1 to 2:1, preferably about 1.8:1 to 2:1, low-monomer polyisocyanates (monomer content less than 2% and generally less than 1.0%) are directly obtained without further separation by virtue of the very different reactivity of the two isocyanate groups in the starting diisocyanate.

If the diisocyanates (i) are reacted with polyols in an NCO:OH equivalent ratio of about 2:1 to 40:1, preferably about 2:1 to 20:1, there is again no need for thin-layer distillation if the sterically unhindered isocyanate groups attached to a primary carbon atoms which are left after urethane formation are converted into isocyanurate groups by cyclotrimerization. The polyisocyanates containing urethane groups and isocyanurate groups are obtained with low monomer contents of less than 2% by weight and preferably less than 1.0% by weight monomeric diisocyanate. In these cases, it is even possible in one preferred embodiment of the invention to add other diprimary diisocyanates, preferably hexamethylene diisocyanate, in sub-equivalent quantities of up to about 40 mole %, based on the aliphatic-cycloaliphatic diisocyanate (i) used, to the polyisocyanates usable in accordance with the invention after urethane formation and before cyclotrimerization in order to influence their properties. In this case trimerization is continued until all isocyanate groups attached to primary carbon atoms have been consumed.

Trimerization catalysts suitable for the described process are any of the compounds which have previously been used for this purpose such as phosphines of the type described in DE-OS 1,934,763; alkaliphenolates of the type described in GB-PS 1,391,066 or GB-PS 1,386,399; aziridine derivatives in combination with tertiary amines of the type described in DE-OS 3,325,826; Mannich bases (such as those based on i-nonylphenol, formaldehyde and dimethylamine) of the type described in U.S.-PS No. 4,115,373; quaternary ammonium carboxylates of the type described in EP-OS 17,998; quaternary ammonium phenolates having Zwitter-ionic structure of the type described, for example, in U.S.-PS No. 4,335,219; ammonium phosphonates and phosphates of the type described in DE-OS 3,227,489; alkali carboxylates of the type described in DE-OS 3,219,608; or basic alkali metal salts in conjunction with phase-transfer catalysts of the type described in detail by R. Richter, P. Muller and K. Wagner in "Die Angewandte Makromolekulare Chemie" 113, 1-9 (1983), among which particular preference is attributed in the present case to potassium acetate complexed with a polyethylene glycol containing an average from 5 to 8 ethylene oxide units.

Other particularly suitable catalysts are quaternary ammonium hydroxides corresponding to the following general formula

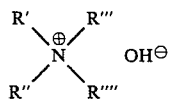

of the type described in DE-OS Nos. 2,806,731 and 2,901,479. Of the quaternary ammonium hydroxides corresponding to the above formula, preference is attributed to those in which the substituents R' to R'''' are the same or different and represent alkyl substituents containing 1 to 20, preferably 1 to 4 carbon atoms which may optionally be substituted by hydroxyl groups. In addition, two of the substituents R' to R''''—together with the nitrogen atom and optionally another nitrogen or oxygen atom—may form a heterocyclic ring containing from 3 to 5 carbon atoms. When the substituents R' to R''' each represent ethylene groups, they may form together with the quaternary nitrogen atom and another tertiary nitrogen atom, a bicyclic triethylenediamine structure, provided that, in this case, the substituent R'''' is a $C_2$-$C_4$ hydroxyalkyl group, the hydroxyl group preferably being in the 2-position to the quaternary nitrogen atom. In the cases mentioned, the hydroxyl-substituted radical or the hydroxyl-substituted radicals may contain any other substituents, particularly $C_1$-$C_4$ alkoxy substituents, in addition to the hydroxyl substituents. These catalysts may be prepared in known manner by the reaction of a tertiary amine with an alkylene oxide in aqueous-alcoholic medium (cf. U.S.-PS No. 3,995,997, column 2, lines 19-41). Suitable tertiary amines include trimethylamine, tributylamine, 2-dimethylaminoethanol, triethanolamine, dodecyl dimethylamine, N,N-dimethyl cyclohexylamine, N-methyl pyrrolidine, N-methyl morpholine or 1,4-diazabicyclo-[2,2,2]-octane. The alkylene oxides used include ethylene oxide, propylene oxide, 1,2-butylene oxide, styrene oxide or methoxy, ethoxy or phenoxy propylene oxide. Particularly preferred catalysts from this group include N,N,N-trimethyl-N-(2-hydroxyethyl)-ammonium hydroxide and N,N,N-trimethyl-N-(2-hydroxypropyl)-ammonium hydroxide.

The trimerization catalysts are generally used in quantities of about 0.005 to 5% by weight, preferably about 0.01 to 2% by weight, based on the starting mixture used for the trimerization reaction. If for example, a preferred catalyst such as N,N,N-trimethyl-N-(2-hydroxypropyl)-ammonium hydroxide is used, quantities of about 0.05 to 1% by weight, preferably about 0.07 to 0.7% by weight, based on the starting mixture, are generally sufficient. The catalysts may be used in pure form or in solution. Suitable solvents—depending on the catalysts—include the solvents which are inert to isocyanate groups such as dimethylformamide or dimethylsulfoxide. When hydroxy compounds forming carbamic acid derivatives are used as co-catalysts, it is of advantage simultaneously to use them as catalyst solvent. Suitable co-catalysts of this type include monoalcohols such as methanol, ethanol, isopropanol or 2-ethylhexanol or glycols such as 1,2-dihydroxyethane, 1,2-dihydroxypropane, 1,3- and 1,4-dihydroxybutane, 1,6- and 2,5-dihydroxyhexane, 2-ethyl-1,3-dihydroxyhexane or 2,2,4-trimethyl-1,3-dihydroxypentane.

The reaction temperature required for trimerization is about 20° to 200° C., preferably about 40° to 160° C. The trimerization reaction is preferably carried out in the absence of solvents.

In the preparation of polyisocyanate component (A), the type of and quantitative ratios between the starting materials and, optionally, the degree of trimerization are selected to give a modified polyisocyanate or a modified polyisocyanate mixture which corresponds to the above-mentioned criteria (a) to (d). The content of tert.-bound isocyanate groups in the modified polyisocyanates is preferably about 12 to 20% by weight; the content of prim.-bound and/or sec.-bound isocyanate groups is preferably below about 0.5% by weight; the average NCO functionality is preferably about 2.2 to 3.8, most preferably 2.3 to 3.5; the urethane group content is preferably about 4 to 22% by weight, the isocyanurate group content is preferably 0 to about 20% by weight; and the content of monomeric starting diisocyanates is below about 2% by weight, preferably below about 1% by weight. The modified polyisocyanates are solid below about 40° C. and liquid above about 150° C. and preferably have a melting point or melting range as determined by differential thermoanalysis (DTA) of about 40° to 130° C. and most preferably about 50° to 110° C. The polyisocyanates or polyisocyanate mixtures (A) generally satisfy these criteria if the above-mentioned recommendations regarding the choice of starting materials, the quantitative ratios between them and the way in which the modification reaction(s) is/are carried out, are observed in the preparation of the polyisocyanates or polyisocyanate mixtures. Thus, the melting point or melting range may be increased, for example, by using branched polyols (Ab) and reduced by using linear polyols (Ab), while the NCO functionality may be increased by using polyols (Ab) of relatively high functionality. The functionality may also be adjusted as required by using different quantities of diprimary diisocyanates, more especially hexamethylene diisocyanate, in the trimerization reaction (which automatically stops after all the prim.-bound isocyanate groups have been consumed). In addition, the content of isocyanurate groups in the modified polyisocyanates has a direct bearing on the melting range of the modified polyisocyanates so that not only the functionality, but also the optimal melting range may be adjusted through the degree of trimerization, i.e. through the number of prim.-bound isocyanate groups present before the trimerization reaction.

The polyhydroxyl component (B) of the powder lacquer according to the invention includes the hydroxyl-containing resins which are solid below about 40° C. and liquid above about 150° C. and typically used in powder lacquer technology. The hydroxyl-containing resins preferably have softening temperatures, as determined by differential thermoanalysis (DTA), of about 40° to 140° C., preferably about 45° to 100° C. The hydroxyl numbers of these resins are generally between about 25 and 200, preferably between about 30 and 130, while the average molecular weight (calculable from the functionality and the hydroxyl content) is generally 400 to about 10,000, preferably about 1000 to 5000.

The following are examples of suitable hydroxyl-containing resins.

1. Polyesters containing hydroxyl groups obtained in the usual way from aromatic, aliphatic or cycloaliphatic glycols or polyols, preferably from aliphatic or cycloaliphatic glycols because of better resistance to chalking and weather and polycarboxylic acids or functional derivatives (esters, acid chlorides, etc.) thereof (cf. Houben-Weyl, XIV/2, pp. 1–46). Suitable glycols include ethylene glycol, 1,2-propanediol, 1,4-butanediol and the isomers thereof, neopentyl glycol, 1,6-hexanediol and the isomers thereof, 2,2-bis (4-hydroxycyclohexyl)-propane and cyclohexane-diol. Suitable polyols include trimethylolpropane, hexanetriol and pentaerythritol. Suitable poly-carboxylic acids include tetrahydrophthalic acid, terephthalic acid, phthalic acid, isophthalic acid and trimellitic acid. Hydroxyl containing polyesters containing about 50 to 65% by weight of aromatic polycarboxylic acids, about 30 to 45% by weight of aliphatic glycols and about 5% by weight of aliphatic triols are particularly preferred.

2. Copolymers containing hydroxyl groups of the type obtained by the copolymerization of, for example, hydroxyalkylacrylates or methacrylates with acrylic or methacrylic acid alkylesters and optionally other olefinically unsaturated monomers, and/or those obtained from styrene-maleic acid copolymers in accordance with DE-OS 2,137,239 by partial esterification of the acid groups with ethylene oxide.

3. Mixtures of the compounds mentioned by way of example in 1. and 2.

The auxiliaries and additives optionally used include pigments (such as titanium dioxide) and flow promoters such as polybutylacrylate or those based on polysilicones.

To prepare the ready-to-use powder lacquer, the polyisocyanate component (A) and the polyhydroxyl component (B) are mixed with one another and optionally with the additives (C) and combined, for example in extruders or kneaders, at temperatures above the melting point range of the individual components, for example at 100° to 160° C., to form a homogeneous material. The solid obtained after cooling of the melt is then ground and freed from particles larger than 0.1 mm in diameter by sifting. The components (A) and (B) are used in such quantitative ratios that about 0.6 to 1.2, preferably about 0.8 to 1.0 isocyanate groups of component (A) are available for each hydroxyl group of component (B). To prepare the ready-to-use powder lacquer from the starting materials, the starting materials only have to be very briefly heated to temperatures above the melting point range of the individual components. It may be assumed that there is no significant reaction between components (A) and (B) during the preparation of the powder lacquer. This is also reflected in the fact that the melting point range of the ready-to-use powder lacquer approximately corresponds to the melting point ranges of the individual components and more especially to the melting point range of the polyhydroxyl component (B) which is generally present in the powder lacquers in relatively large quantities by weight. In addition, a brief preliminary test is all that is needed to determine the optimal temperature at which to prepare the ready-to-use powder lacquer, i.e. the temperature which on the one hand the individual components present in the melt can be satisfactorily intermixed while, on the other hand, the risk of an unwanted preliminary reaction is largely ruled out.

The powder lacquer thus prepared may be applied to the substrates to be coated by standard powder application techniques such as electrostatic powder spraying or fluidization dip coating. The coatings are hardened by heating to temperatures of about 150° to 220° C., preferably about 170° to 190° C., for example over a period of about 10 to 30 minutes. Hard, glossy and elastic coatings characterized by outstanding anticorrosion properties and very good color stability to heat are obtained.

In the following examples, all the percentages, apart from the gloss values, are percentages by weight.

EXAMPLES

Starting materials

Diisocyanate I:
1-isocyanato-1-methyl-4(3)-isocyanatomethyl cyclohexane (Example 1 of DE-OS 3,402,623 or Example 1 of U.S. Pat. No. 4,613,685)

Diisocyanate II:
1,3-bis(2-isocyanatoprop-2-yl)-benzene

Catalyst I:
10% solution of 2-hydroxypropyl trimethylammonium hydroxide in 2-ethyl-1,3-dihydroxyhexane/1,3-dihydroxybutane (ratio by weight of the solvents 4:1).

EXAMPLE 1

(Preparation of a polyisocyanate component A according to the invention)

194 g diisocyanate I and 20.8 g neopentyl glycol were reacted for 8 hours at 60° C. to an NCO-content of 31.5%.

16.8 g 1,6-diisocyanatohexane were then added, followed by the addition at 50° C. of 3 ml of catalyst solution I. The reaction mixture was initially kept at 60° C. by cooling and was then heated at that temperature. After 2.5 hours, at which time the NCO content had reached 19.5%, the reaction mixture was heated to 110° C. After stirring for 30 minutes at 110° C., the reaction mixture was poured onto a metal plate. After cooling to room temperature, a clear solid resin having an NCO content of 15.3% and a melting range (as determined by differential thermoanalysis) of 50° to 55° C. was obtained. The content of monomeric diisocyanate I was below 1% and the content of monomeric 1,6-diisocyanatohexane was below the detection limit, i.e. below 0.03%. The modified polyisocyanate had a urethane group content of 10.2% and an isocyanurate group content of 14.5% by weight.

EXAMPLE 2

(Preparation of a polyisocyanate component A according to the invention)

194 g diisocyanate I were reacted with 13.4 g trimethylol propane for 8 hours at 60° C. until the NCO-content was 34.2%. The reaction was catalyzed by the addition at 50° C. of 3 ml of catalyst solution I. After 2 hours, at which time an NCO content of 20.5% had been reached, the reaction mixture was heated with stirring for another 30 minutes to 110° C. It was then poured onto a metal plate. A clear solid resin having an NCO content of 16.8% and a melting range (as determined by differential thermoanalysis) of 55° to 60° C. was obtained. The content of monomeric diisocyanate I was below 1%. The modified polyisocyanate contained 8.5% urethane groups and 14.2% isocyanurate groups.

EXAMPLE 3

(Preparation of a polyisocyanate component A according to the invention)

194 g diisocyanate I were reacted with 13.4 g trimethylolpropane for 7 hours at 60° C. to an NCO content of 34.4%. After the addition of 16.8 g 1,6-diisocyanatohexane, 2 ml catalyst solution I were added at 50° C. The exothermic reaction mixture was kept at 60° C. by cooling and, after 2 hours, reached an NCO content of 21.3%. After stirring for 30 minutes at 110° C., the reaction mixture was heated to 130° C. and poured onto a metal plate. A clear solid resin having an NCO content of 15.5% and a melting range (as determined by differential thermoanalysis) of 60° to 65° C. was obtained. The content of monomeric diisocyanate I was below 0.5% and the content of monomeric 1,6-diisocyanatohexane was below 0.03%. The modified polyisocyanate contained 7.9% urethane groups and 16.9% isocyanurate groups.

EXAMPLE 4

(Preparation of a polyisocyanate component A according to the invention)

194 g diisocyanate I and 20.8 g neopentyl glycol were reacted for 8 hours until the NCO content was 31.0%. After addition of 42.0 g 1,6-diisocyanatohexane, 2.5 ml catalyst solution I were added at 50° C. After a reaction time of 3 hours at 60° C., at which time an NCO content of 18.9% had been reached, the reaction mixture was heated to 110° C. and stirred at that temperature for 30 minutes. The reaction mixture was then poured onto a metal plate and, after cooling of the melt, a clear solid resin having an NCO content of 13.6% and a melting range (as determined by differential thermoanalysis) of 50° to 60° C. was obtained. The content of monomeric diisocyanate I was below 0.5% and the content of monomeric 1,6-diisocyanato-hexane was below 0.03%. The urethane group and isocyanurate group contents were 9.2% and 17.8%, respectively.

EXAMPLE 5

(Use)

48 parts by weight of a polyester containing hydroxyl groups, which had been prepared from 66.6 parts by weight terephthalic acid, 38.2 parts by weight neopentyl glycol, 5.3 parts by weight 1,6-dihydroxyhexane and 4.5 parts by weight trimethylol propane and which had an OH number of 50 and a melting range (as determined by differential thermoanalysis) of 55° to 60° C., were melted at approximately 120° C. and homogenized in an extruder with 12 parts by weight of the modified polyisocyanate obtained in accordance with Example 2 and 40 parts by weight of a commercially available titanium dioxide pigment. The quantities of the polyhydroxyl polyester and the polyisocyanate were selected to provide an equivalent ratio of OH:NCO groups of 1:1. After the melt had solidified, the product was ground, applied to test plates by means of an electrostatic spray applicator and hardened for 15 minutes at 180° C. For a layer thickness of approximately 55 μm, the powder lacquer was found to have the following properties:
Gloss: 88%
  (Gardner, 60° reflexion angle)
Erichsen indentation: >9.0 mm
  (DIN 53,156)
Whiteness: 80.5; after 20 mins. at 220° C.: 69.0
  (after Berger/Elrephomat)
Gel time: 161 seconds/180° C.
  (DIN 55,990, Part 8, point 5.1)
Fluidity: fluid up to 50° C.
  (DIN 55,990, Part 7, 2 weeks at 45° and 50° C.)

EXAMPLE 6

(Use)

48.3 parts by weight of the hydroxyl-containing polyester of Example 5, 11.7 parts by weight of the modified polyisocyanate obtained in accordance with Example 3 and 40 parts by weight of a commercial titanium dioxide pigment were homogenized in an extruder at 120° C., the equivalent OH:NCO ratio of the polyhydroxyl polyester and the polyisocyanate being 1:1. After the melt has solidified, the ground product was applied to test plates by means of an electrostatic spray applicator and hardened for 15 minutes at 200° C.

For a layer thickness of approximately 55 μm, the powder lacquer was found to have the following properties:
Gloss: 90%
Erichsen indentation: >9.0 mm
Whiteness: 79.7; after 20 minutes at 220° C.: 70.3
Gel time: 133 seconds/180° C.
Fluidity: fluid up to 50° C.

EXAMPLE 7

(Use)

48 parts by weight of the hydroxyl-containing polyester used in Example 5, 12 parts by weight of the modified polyisocyanate obtained in accordance with Example 4 and 40 parts by weight of a commercially available titanium dioxide pigment were homogenized in an extruder at 120° C. After solidification, the melt was ground to a powder lacquer. The powder lacquer thus obtained is applied to test plates by means of an electrostatic spray applicator and hardened for 15 minutes at 180° C. to form an approximately 55 μm thick layer.

The powder lacquer was found to have the following properties:
Gloss: 90%
Erichsen indentation: >9.0 mm
Whiteness: 78.8, after 20 minutes at 220° C.: 73.2
Gel time: 129 seconds/180° C.
Fluidity: fluid up to 45° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

EXAMPLE 8

(Preparation of a polyisocyanate component A according to the invention)

134 g of trimethylol propane were added dropwise in the course of 2 hours to 1830 g of diisocyanate II at 120° C. under stirring. The reaction mixture was allowed to react at this temperature until an NCO content of 25,2% was reached. Thereafter unreacted diisocyanate II was removed by thin layer destillation at 180° C./0,1 mbar.

800 g of a clear solid resin were obtained having a NCO content of 12,5% and a melting range (as determined by differential thermoanalysis) of 50° to 55° C.

The content of monomeric diisocyanate II was below 0,5%. The content of urethane groups was 22,6%.

EXAMPLE 9

(Use)

46,2 parts by weight of the polyester containing hydroxyl groups of Example 5, 13,8 parts by weight of the modified polyisocyanate of Example 8 and 40 parts by weight of a commercially available titanium-dioxide pigment were homogenized at approximately 120° C. in an extruder the equivalent ratio of OH:NCO groups being 1:1. After the melt had solidified, the product was ground, applied to test plates by means of an elektrostatic spray applicator and hardened for 15 minutes at 200° C. forming a layer having a thickness of approximately 55 μm.

The powder lacquer was found to have the following properties:
Gloss: 87%
Erichsen indentation: 8,5 mm
Gel time: 120 seconds/180° C.
Fluidity: fluid up to 45° C.

What is claimed is:
1. A composition comprising
   (A) a polyisocyanate component in powder form which is solid below about 40° C. and liquid above about 150° C. which
      (a) does not contain any blocking agents for isocyanate groups,
      (b) has a content of free isocyanate groups (expressed as NCO) attached to tertiary aliphatic or tertiary cycloaliphatic carbon atoms of about 8 to 24% by weight and an average NCO functionality of at least 2.1,
      (c) has a content of urethane groups (expressed as —NH—CO—O—) of about 3 to 30% by weight and
      (d) has a content of isocyanurate groups (expressed as $C_3N_3O_3$) of 0 to about 30% by weight and
   (B) an organic polyhydroxyl component in powder form which is solid below about 40° C. and liquid above about 150° C.
2. The composition of claim 1 wherein said polyisocyanate component is based on a member selected from the group consisting of 1-isocyanato-1-methyl-4-isocyanatomethyl cyclohexane, 1-isocyanato-1-methyl-3-isocyanatomethyl cyclohexane and mixtures thereof.
3. A coated heat resistant substrate coated with the composition of claim 1.

* * * * *